United States Patent [19]
Dhein et al.

[11] 3,883,454
[45] May 13, 1975

[54] BINDERS FOR ENVIRONMENTALLY HARMLESS LAQUER SYSTEMS

[75] Inventors: Rolf Dhein; Bernd-Ulrich Kaiser, both of Krefeld; Hans Rudolph, Krefeld-Bockum; Rolf Küchenmeister; Clemens Niehaus, both of Krefeld, all of Germany

[73] Assignee: Bayer Aktiengesellschaft, Germany

[22] Filed: Oct. 29, 1973

[21] Appl. No.: 410,771

[30] Foreign Application Priority Data
Oct. 31, 1972 Germany............................ 2253325
June 19, 1973 Germany............................ 2304550
Aug. 31, 1973 Germany............................ 2343976

[52] U.S. Cl........ 260/22 R; 117/124 E; 117/161 K; 260/21; 260/22 CQ
[51] Int. Cl.. C08g 37/34; C09d 11/10; C09d 11/12
[58] Field of Search.......... 260/22 CQ, 21, 850, 76, 260/22 R

[56] References Cited
UNITED STATES PATENTS

| | | | |
|---|---|---|---|
| 3,350,335 | 10/1967 | Silver | 260/22 CB |
| 3,434,987 | 3/1969 | Dhein et al. | 260/21 |
| 3,449,467 | 6/1969 | Wynstra | 260/850 |
| 3,549,577 | 12/1970 | Stromberg | 260/850 |
| 3,686,360 | 8/1972 | Cunningham | 260/850 |
| 3,691,258 | 9/1972 | Riemhofer et al. | 260/850 |
| 3,752,778 | 8/1973 | Dhein et al. | 260/22 TN |

Primary Examiner—Ronald W. Griffin
Attorney, Agent, or Firm—Connolly and Hutz

[57] ABSTRACT

Object of the invention are binders for environmentally harmless lacquer systems having only a low solvent content which are based on an oligomeric alkyl resin of a polyalcohol and an aromatic dicarboxylic acid which may be modified with an unsaturated fatty acid and optionally other monocarboxylic acids and comprise an aromatic dicarboxylic acid as a semiester.

8 Claims, No Drawings

BINDERS FOR ENVIRONMENTALLY HARMLESS LAQUER SYSTEMS

This invention relates to binders for environmentally harmless lacquer systems which have only a low solvent content, can be processed as liquids even when they have high solids contents and which liberate little or no organic solvent to the environment and therefore combine the advantages of lacquer solutions with those of solid lacquer systems.

Lacquer systems which are solvent-free or have only low solvent contents have been in existence for a long time; they include, among others, powder lacquers. These pulverulent lacquer mixtures have the advantage that they do not split off any harmful solvents when hardened in the heat but the process for manufacturing these lacquers entails serious practical difficulties because the powders are liable to cake together in the heat and, in the case of certain colour shades, the lacquers can be coloured uniformly only by melting the powders to form uniform lacquer melts which must then be size-reduced after cooling (DL-PS 55820).

The polyurethane coatings which can be obtained from diisocyanates and liquid polymers which contain hydroxyl groups may be regarded as solvent-free systems which are liquid. These systems have, however, the disadvantage that mixtures of diisocyanate components with polymers which contain hydroxyl groups are stable for only a limited length of time (German Offenlegungsschrift No. 2,105,062).

On the other hand, stoving lacquers containing large quantities of solvents and based on fatty acid modified alkyd resins which are cross-linked with melamine resins have for many years been very widely used in the whole field of stoving lacquers. There have been numerous attempts to render these lacquer systems less harmful to the environment. Much work has been devoted to attempts to replace the organic solvents with water. However, systems which can be diluted with water have the disadvantage that, apart from the harmful amines required for neutralisation, they also require substantial quantities of harmful solvents for dilution. In addition, large amounts of energy are required for evaporating the solvents of these systems during the stoving process.

With a view to obtaining stoving lacquer systems which contain little or no solvent but are at the same time, liquid, it has also been attempted to convert alkyd resins into liquid lacquer raw materials by a process of precondensation with methylol melamines carried out at elevated temperatures.

This method, however, has the serious disadvantage that methylol melamines are incompatible with alkyd resins before they are united. To render these two substances compatible with each other, it is necessary to carry out a heat treatment in which valuable methylol groups required for the cross-linking reaction are lost. The result of this is that the finished lacquers harden only at very high temperatures, e.g. 180°C (German Offenlegungsschrift Nos. 2,036,289; 2,036,714 and 2,055,107).

Lastly, the electrophoretic lacquering process should also be mentioned in this connection. This system, however, has the disadvantage that it can only be used for lacquering conductive components.

There have been numerous attempts to concentrate the commercially valuable stoving lacquer systems which contain solvents. In German Offenlegungsschrift No. 2,019,282 binder systems which as clear lacquers contain about 30% of solvent are disclosed. With these systems, however, troublesome formation of bubbles is liable to occur and it has therefore been recommended to apply these lacquers at temperatures of about 60°C.

A further disadvantage is that, in order to achieve these aims, no unsaturated fatty acids may be added and the polyalcohol pairs and dicarboxylic acid pairs must not only be selected from a narrow range but must also be adapted to each other. Moreover, the compatibility with aminoplasts is limited and can in some cases only be achieved by a preliminary heat treatment.

It is an object of this invention that alkyd resins modified with unsaturated fatty acids, which are particularly valuable lacquer raw materials for stoving lacquers and which have for decades been used e.g. for lacquering motorcars, should be freed from their large quantities of solvent and thus rendered harmless to the environment.

This invention relates to a binder for a low-solvent melamine resin containing lacquer system which binder is based on an oligomeric alkyd resin of a polyalcohol and an aromatic dicarboxylic acid which may be modified with an unsaturated fatty acid and optionally other monocarboxylic acids the molar ratio of polyalcohol to aromatic dicarboxylic acid to monocarboxylic acid being between 1:0.5:0.5 and 1:0.8:1.5, which binder additionally comprises from 0.05 to 0.65 equivalents of aromatic dicarboxylic acid attached by partical condensation as a semiester in 1000 parts by weight of alkyd resin.

These ratios are not unusual but are critical. It was surprising and not foreseeable that, in contradiction to the commonly held view that only higher molecular weight alkyd resins could give rise to elastic lacquers, these oligoalkyd resins produced with these critical ratios would, in spite of their molecular weight range of 800 to 2000, be suitable for the production of not only elastic but also hard lacquers. It was also surprising that these systems, in contrast to the previously known more highly concentrated binders, (German Offenlegungsschrift No. 2,019,282) are also more compatible with melamine resins. There is in addition, the further advantage that, in spite of the modification with fatty acid, lacquers which have no tendency to yellowing can be obtained. In particular, lacquer systems which contain less than 30 % of solvents, e.g. 20% and 10%, can be produced by this process. Solvents can be completely dispensed with if they are replaced by polyalcohols which can take part in the cross-linking reaction. The fatty acid modified oligoalkyd resins are also distinguished by the fact that they can easily be thinned by heating so that the binders according to the invention for low-solvent lacquer systems based on the above mentioned oligoalkyd resins give rise to so-called high solid lacquer systems which are particularly easy to apply and the lacquers not only provide the good protection against corrosion which is known to be characteristic of alkyd resins but also have a very good flow.

In the alkyd resins according to the invention, the quantity of unsaturated oils is between 20 and 40% by weight, preferably between 25 and 36 % by weight, based on the alkyd resin. It is, however, possible to replace the unsaturated oils partly or completely by saturated monocarboxylic acids. The partly compensation of the unsaturated oils by saturated monocarboxylic acids means preferably a substitution in an amount of 30–60 per cent of the total amount of said unsaturated oils present. The hydroxyl numbers are between 40 and 150, preferably between 50 and 120.

Melamine resins in the context of this invention are reaction products of melamine and formaldehyde which are partly or completely etherified with monoalcohols and which are liquid products and which may still contain monoalcohols and solvents, which can be mixed with alkyd resins to form clear mixtures. Benzoguanamine resins and urea may also be used, but the melamine resins are preferred. Phenol resins may also be added but they have the disadvantage of causing pronounced yellowing.

The oligomeric alkyd resins are prepared from polyalcohols such as ethylene glycol, propylene glycol, diethylene glycol, butanediol, hexanediol, perhydrobisphenol, bis-hydroxyethylbisphenol, glycerol, trimethylol-propane, pentaerythritol and sorbitol or mixtures of these polyols. The composition of the polyalcohols must be such that the hydroxyl number is kept within the range specified.

Glycerol and trimethlolpropane are particularly preferred for the low-viscosity, high-solid systems but these trihydric alcohols may be replaced to an extend of up to 20 mols-% with dihydric alcohols such as ethylene glycol, propylene glycol, diethylene glycol, butanediol, hexanediol, perhydrobisphenol or bis-hydroxyethyl-bisphenol.

Phthalic acid, isophthalic acid and terephthalic acid are suitable aromatic dicarboxylic acid. Phthalic acid is preferred. These acids may be replaced to an extent of up to 20 mols-% by other dicarboxylic acids such as tetra- and hexahydrophthalic acid, adipic acid or maleic acid. Phthalic acid and adipic acid are preferred.

The following are suitable monocarboxylic acids which may be used apart from the unsaturated natural fatty acids: benzoic acid, hexahydrobenzoic acid, butyl benzoic acid, tolyl acid, $\alpha$-ethyl-hexanonic acid as well as saturated, branched or linear fatty acids with eight to 18 carbon atoms per molecule. Benzoic acid and $\alpha$-ethyl-hexanoic acid are preferred for low-viscosity high-solid alkyd resins which are particularly compatible with melamine resins.

Suitable natural unsaturated fatty acids are the following: fatty acids of castor oil or of dehydrated castor oil, soya oil, isomerized soy oil, safflower oil, cotton seed oil, peanut oil and tall oil. Linseed oil may also be used in quantities of up to 50 mols-%.

Alkyd resins obtained from castor oil are particularly preferred. Among these, the following are the most advantageous: Dehydrated castor oil alkyd resins containing from 23 to 28% or from 30 to 38% by weight of dehydrated castor oil, particularly if the polyalcohols, dicarboxylic acid and monocarboxylic acid are condensed in proportions of between 1:0.5:1.2 and 1:07:1.5.

Apart from the condensed dicarboxylic acid, the polycondensates according to the invention also contain from 0.05 to 0.65 equivalents of monoesterified dicarboxylic acids in 1,000 parts by weight of binder. These differ from the condensed dicarboxylic acid in that only one carboxylic group is esterified while the second remains unesterified in the finished polycondensate.

The quantity of monoesterified dicarboxylic acid present does not influence the "high solid" properties of the polycondensate such as the ease with which it can be applied when it has a high solids content. The monoesterified dicarboxylic acid present serves only to provide an acid catalysed control of the extend of the cross-linking reaction with melamine resins. Thus, if small quantities of monoesterified dicarboxylic acid are used, high solid binders are obtained which are suitable for the production of lacquers which are extremely stable in storage. On the other hand, if a larger quantity of monoesterified dicarboxylic acid is used, the lacquer systems obtained are highly reactive, i.e., they require only low stoving temperatures. The quantity of monoesterified dicarboxylic acid can easily be determined by the acid number of the oligoalkyd resin. One equivalent corresponds to an acid number of 56.1.

The preparation of the alkyd resins is carried out by known processes. When natural oils are used, it is advisable to carry out an ester interchange stage at about 260°C. The components of the alkyd resins may all be reacted at the same time, especially when fatty acids are used, although the alkyd resin may also be prepared by a two-stage process, the first stage giving rise to a polycondensate which contains polyalcohols and condensed dicarboxylic acids and monocarboxylic acids and in which the quantity of monoesterified dicarboxylic acid is less than 0.05 equivalents per 1,000 parts by weight of polycondensate, the polycondensate and dicarboxylic acid anhydride then reacting together in the second stage with semiester formation to yield the oligoalkyd resin according to the invention.

The dicarboxylic acid anhydrides used may be the anhydrides of dicarboxylic acids already mentioned above.

This method is particularly preferred.

The oligoalkyd resins according to the invention may be processed into low-solvent lacquer systems. The following are suitable solvents: Hydrocarbons such as toluene, xylene and petroleum hydrocarbons, ketones such as cyclohexanone, alcohols such as propanol and butanol, ethylene glycol monoethyl ether, ethylene glycol monobutyl ether, and esters such as butyl acetate and ethyl glycol acetate.

The following are polyalcohols which may take part in the cross-linking reaction: Ethylene glycol, propylene glycol, 2-ethyl-hexane-1,3-diol, glycerol, trimethylolpropane and castor oil.

The novel lacquer systems which have only a low solvent content may be applied in the same way as the high-solvent lacquers previously known. If the lacquers are exceptionally highhly viscous, it is advisable to apply them hot in so-called hot spraying plants. In this case the sharp reduction in viscosity with increasing temperature is particularly advantageous. The usual auxiliary agents such as stabilisers, pigments and fillers, may be used in the same way as in high-solvent lacquers.

The parts given in the following examples are parts by weight.

EXAMPLE 1

A polycondensate having an acid number below 2 and a viscosity of 14 seconds (50% in xylene, determined according to DIN 53 211) was prepared from 1,370 parts of trimethylolpropane, 864 parts of phthalic acid anhydride, 1,390 parts of dehydrated castor oil, 244 parts of benzoic acid and 720 parts of $\alpha$-ethylhexanoic acid by esterification at 230°C under nitrogen. In a second reaction stage, 970 parts of the product from the first stage were reacted with 30 parts of phthalic acid anhydride at 160°C. An oligoalkyd resin which had an acid number of 12 and a viscosity of 840 cP determined on an 80 % solution in butyl acetate was obtained.

This oligoalkyd resin had a dehydrated castor oil content of about 32%, its proportion of polyalcohol to condensed dicarboxylic acid to monocarboxylic acid was about 1:0.6:1.2 and it contained 0.21 equivalents of monoesterified dicarboxylic acid per 1,000 parts by weight of oligoalkyd resin. A highly concentrated but highly fluid clear lacquer which may also be sprayed hot can be obtained from 125 parts of the 80 % solution in butyl acetate and 41.7 parts of a 72% solution of a melamine resin in butanol. This lacquer gives rise to extremely firmly adhering, nail-hard and elastic coats.

EXAMPLE 2

An oligoalkyd resin with an acid number of 5.1 and a viscosity of 20 inches (50% in xylene measured according to DIN 53 211) was prepared from 1,152 parts of trimethylolpropane, 1,110 parts of phthalic acid anhydride, 1,305 parts of castor oil and 268 parts of benzoic acid by dehydration, trans-esterification and esterification at 260°C in a nitrogen atmosphere.

In a second stage of the reaction 3,585 parts of the preliminary stage are reacted with 103 parts of phthalic acid anhydride. An oligoalkyd resin was produced with an acid number of 18.3 and a viscosity of 23 inches (50% in xylene.

This oligoalkyd resin contained 33.3% of fatty acid, a ratio of polyalcohol to condensed dicarboxylic acid to monocarboxylic acid of about 1.0:0.7:0.65 and 0.33 equivalents of one condensed dicarboxylic acid per 1,000 parts by weight of oligoalkyd resin.

EXAMPLE 3

1,340 parts of trimethylolpropane, 1,182 parts of phthalic acid anhydride, 612 parts of conjugated soya oil fatty acid, 556 parts of ground-nut oil fatty acid and 268 parts of p-tert.-butylbenzoic acid were esterified at 230°C in a nitrogen atmosphere up to an acid number of 7.1 and a viscosity of 50 inches (60% in xylene measured according to DIN 53 211).

In a second stage of the reaction 3713 parts of the preliminary stage were reacted with 195 parts of phthalic acid anhydride at 180°C. An oligoalkyd resin was produced with an acid number of 16.8 and a viscosity of 5,320 cP (80% in ethylglycol acetate).

This oligoalkyd resin contained 30.2% of fatty acid, a ratio of polyalcohol to condensed dicarboxylic acid to monocarboxylic acid of about 1.00:0.68:0.55 and 0.03 equivalents of one condensed dicarboxylic acid per 1,000 parts by weight of oligoalkyd resin.

EXAMPLE 4

1,139 parts of trimethylolpropane, 117 parts of propane diole-1,2, 740 parts of phthalic acid anhydride, 146 parts of adipinic acid, 973 parts of soya oil fatty acid and 640 parts of hexahydrobenzoic acid were esterified at 230°C in a nitrogen atmosphere up to an acid number of 1.2 and a viscosity of 32 inches (60% in xylene measured according to DIN 53 211).

In a second stage of the reaction 3,476 parts of the preliminary stage were reacted with 296 parts of phthalic acid anhydride at 180°C. An oligoalkyd resin is produced with an acid number of 30.2 and a viscosity of 3,870 cP (80% in ethylglycol acetate).

This oligoalkyd resin contained 25% of fatty acid and had a ratio of polyalcohol to condensed dicarboxylic acid to monocarboxylic acid of about 1.0:0.6:0.85 and 0.53 equivalents of precondensed dicarboxylic acid per 1000 parts by weight of oligoalkyd resin.

EXAMPLE 5

White lacquers were produced from the oligoalkyd resins of Examples 2, 3 and 4 according to the following recipe:

A lacquer of 100 parts of 80% alkyd resin solution (solvent: ethylglycol acetate), 80 parts of titanium dioxide (rutile), 20 parts of Cymel 301 (Casella) and 1 part of p-toluene sulphonic acid, 20 % in isopropanol, are diluted with butyl acetate to the processing viscosity. The lacquers were sprayable at room temperature and up to temperatures of 80°C with a test content between 75 and 85% and can be hardened out at a dry film thickness of 60μ so that no running off occurs.

In order to test its technical properties the lacquer dye was applied to glass plates and baked for 30 minutes at 120°C.

EXAMPLE 6

An oligoalkyd resin with the acid number 9 and a viscosity of 2,090 centipoises (measured in 80% solution of ethyl glycol acetate) is prepared from 1,340 parts of trimethylol propane, 740 parts of phthalic acid anhydride, 292 parts of adipic acid, 438 parts of α-ethyl hexoic acid and 764 parts of hexahydrobenzoic acid by esterification at 230°C in a nitrogen atmosphere. This oligoalkyd resin has a ratio of polyalcohol to condensed dicarboxylic acid of approximately 1.0:0.65:0.09 and contains 0.14 equivalents of dicarboxylic acid attached by partial condensation as a semiester per 1000 parts by weight of oligoalkyd resin.

From 125 parts of the 80% solution in ethyl glycol acetate and 41.7 parts of a 72% solution of a melamine resin in butanol there can be prepared a clear lacquer which though being highly concentrated in free-flowing and sprayable in the hot state and which results in highly adhesive, hard and elastic lacquer coatings.

Table to example 5

|  | Layer thickness | Lustre (ASTM-D-532–56T) | Haze | Adhesiveness | Erichsen Deep-Drawing | Pendulum Hardness (DIN 53157) |
| --- | --- | --- | --- | --- | --- | --- |
| Lacquer according to Example 2 | 50/μ | 92 | 0 | 0/1 | 8,2 | 110" |
| Lacquer according to Example 3 | 50/μ | 90 | 0 | 0 | 8,0 | 116" |
| Lacquer according to Example 4 | 50/μ | 87 | 0 | 0 | 9,0 | 110" |

0 = very good
4 = bad

We claim:
1. A binder for a low solvent lacquer system containing a melamine resin, said binder consisting essentially of an oligomeric alkyd resin obtained by condensing a polyalcohol, an aromatic dicarboxylic acid and a monocarboxylic acid in molar ratios of between 1:0.5:0.5 and 1:0.8:1.5 and by additionally partially condensing 0.05 to 0.65 equivalents of aromatic dicarboxylic acid as a semiester with each 1,000 parts by weight of alkyd resin, said monocarboxylic acid being selected from the group consisting of unsaturated natural fatty acids, benzoic acid, hexahydrobenzoic acid, butyl benzoic acid, tolyl acid, α-ethylhexanoic acid, saturated, branched and linear fatty acids having eight to 18 carbon atoms per molecule and mixtures thereof.

2. The binder of claim 1 wherein said molar ratio is between 1:0.5:1.2 and 1:0.7:1.5.

3. The binder of claim 1 wherein said polyalchol is glycerol, trimethylolpropane or a mixture thereof.

4. The binder of claim 3 wherein said glycerol, trimethylolpropane or mixture thereof is replaced up to an extent of 20 mol % by a dihydric alcohol.

5. The binder of claim 1 wherein said aromatic dicarboxylic acid is phthalic acid.

6. The binder of claim 1 wherein up to 20 mol % of said aromatic dicarboxylic acid is replaced by a dicarboxylic acid selected from the group consisting of tetrahydrophthalic acid, hexahydrophthalic acid, adipic acid and maleic acid.

7. The binder of claim 1 wherein said unsaturated natural fatty acid is castor oil or dehydrated castol oil.

8. The binder of claim 1 wherein said monocarboxylic acid is benzoic acid, α-ethyl-hexanoic acid or a mixture thereof.

* * * * *